United States Patent [19]

Foster

[11] Patent Number: 4,572,150

[45] Date of Patent: * Feb. 25, 1986

[54] ENGINE INCLUDING MEANS FOR RETARDING SPARKING OPERATION TO CONTROL ENGINE OVERSPEED

[75] Inventor: Leslie W. Foster, Wayzata, Minn.

[73] Assignee: Outboard Marine Corporation, Waukegan, Ill.

[*] Notice: The portion of the term of this patent subsequent to May 15, 2001 has been disclaimed.

[21] Appl. No.: 607,193

[22] Filed: May 4, 1984

Related U.S. Application Data

[63] Continuation of Ser. No. 415,340, Sep. 7, 1982, Pat. No. 4,448,179, which is a continuation-in-part of Ser. No. 309,557, Oct. 8, 1981, abandoned.

[51] Int. Cl.[4] ............... F02P 5/04; F02P 1/00; F02P 3/06
[52] U.S. Cl. .................... 123/602; 123/149 C; 123/335
[58] Field of Search .......... 123/418, 399, 630, 198 D, 123/149 C, 415, 334, 335, 599, 602, 601

[56] References Cited

U.S. PATENT DOCUMENTS

| | | | |
|---|---|---|---|
| 4,075,989 | 2/1978 | Nagasawa | 123/602 |
| 4,079,712 | 3/1978 | Nagasawa | 123/602 |
| 4,144,859 | 3/1979 | Ohki et al. | 123/335 |
| 4,204,490 | 5/1980 | Ohki et al. | 123/149 C |
| 4,276,868 | 7/1981 | Barrows et al. | 123/149 C |
| 4,343,273 | 8/1982 | Kondo et al. | 123/602 |
| 4,344,395 | 8/1982 | Kondo et al. | 123/602 |

Primary Examiner—Raymond A. Nelli
Attorney, Agent, or Firm—Michael, Best & Friedrich

[57] ABSTRACT

Disclosed herein is an internal combustion engine including a mechanism for providing a potential capable of producing a spark when applied to a spark plug, first and second trigger means respectively and selectively operable for applying the potential to the spark plug to produce a spark at a normal timing relative to top dead center and at a retarded timing relative to top dead center, and a switch connected to the first trigger means and operable in response to engine rotation above a given speed for interrupting the operation of the first trigger means so as to change the timing of sparking operation from the normal timing to the retarded timing.

2 Claims, 2 Drawing Figures

ENGINE INCLUDING MEANS FOR RETARDING SPARKING OPERATION TO CONTROL ENGINE OVERSPEED

RELATED APPLICATION

This is a continuation of application Ser. No. 414,340, filed Sept. 7, 1982, now U.S. Pat. No. 4,448,179, issued May 15, 1984, which in turn is a continuation-in-part of application Ser. No. 309,557, filed Oct. 8, 1981, and now abandoned.

BACKGROUND OF THE INVENTION

The invention relates generally to internal combustion engines. More particularly, the invention relates to ignition arrangements for such engines and to arrangements for preventing engine overspeed.

Attention is directed to Bodig U.S. Pat. No. 3,703,889 which discloses prevention of engine overspeed by interuption of ignition as compared to retarding the timing of ignition as hereinafter disclosed.

Attention is also directed to Nagasawa U.S. Pat. No. 4,075,989 which discloses a method for continuously retarding engine overspeed in a number of incremental steps, as compared to a one step retardation of the timing of ignition as hereinafter disclosed.

SUMMARY OF THE INVENTION

The invention provides an internal combustion engine comprising means for providing a potential capable of producing a spark when applied to a spark plug, means selectively operable for applying the potential to the spark plug to produce a spark at a normal timing relative to top dead center and at a retarded timing relative to top dead center, and means operable in response to engine rotation above a given speed for operating the selectively operable means to change the timing of sparking operation from the normal timing to the retarded timing.

In one embodiment, the means for providing a potential capable of producing a spark when applied to a spark plug comprises a relatively rotatable magnet and coil means.

In one embodiment of the invention, the means selectively operable to produce a spark at a normal timing and at a retarded timing comprises a rotatable magnet, a first trigger means mounted adjacent to the magnet for generating a first signal which is effective to cause sparking operation at a normal timing, and a second trigger means mounted adjacent to the magnet in spaced relation to the first trigger means and operable to generate a second signal which is effective, when the first signal is disabled, to cause sparking operation at a retarded timing.

In one embodiment of the invention, the means for changing the timing of sparking operation from normal to retarded comprises switch means coupled to the first trigger means and operative to interrupt operation of the first trigger signal to cause sparking operation, and means for operating the switch means.

In one embodiment of the invention, the means for operating the switch means includes a member movable between a first position which is inoperative to actuate the switch means and a second position which is operative to actuate the switch means to disable the first signal from causing normal sparking operation.

In one embodiment of the invention, the engine includes a flywheel having means for causing an air flow proportional to engine speed, and the member comprises a movably mounted vane which is biased to the first position and which is movable, incident to air flow responsive to engine speed over a predetermined speed, to the second position so as to actuate the switch means to disable the first signal from causing normal sparking operation and thereby to permit retarded sparking operation in response to the second signal.

In one embodiment of the invention, the means operable to produce a spark includes an armature and the vane is pivotably mounted on the armature.

In one embodiment of the invention, the means for opening the switch means comprises an electronic circuit.

In one embodiment of the invention, the electronic circuit comprises means for generating a signal having a frequency proportional to engine speed, means for converting the signal from a frequency mode signal to a potential mode signal, means for comparing the potential mode signal in relation to an engine revolution reference to produce an output, and means for employing the output to control the switch means.

One of the principal features of the invention is to provide a means for retarding sparking operation which will serve, once a maximum engine rotation speed is reached, to instantly retard the spark timing so as to permit only a slight amount of engine overspeed. Sometimes more than a slight amount of engine overspeed can result in significant damage to an engine or adversely affect the performance of a precise engine driven mechanism, such as an alternator or generator.

Other features and advantages of the embodiments of the invention will become known by reference to the following general description, claims and apprended drawings.

IN THE DRAWINGS

Figure 1:
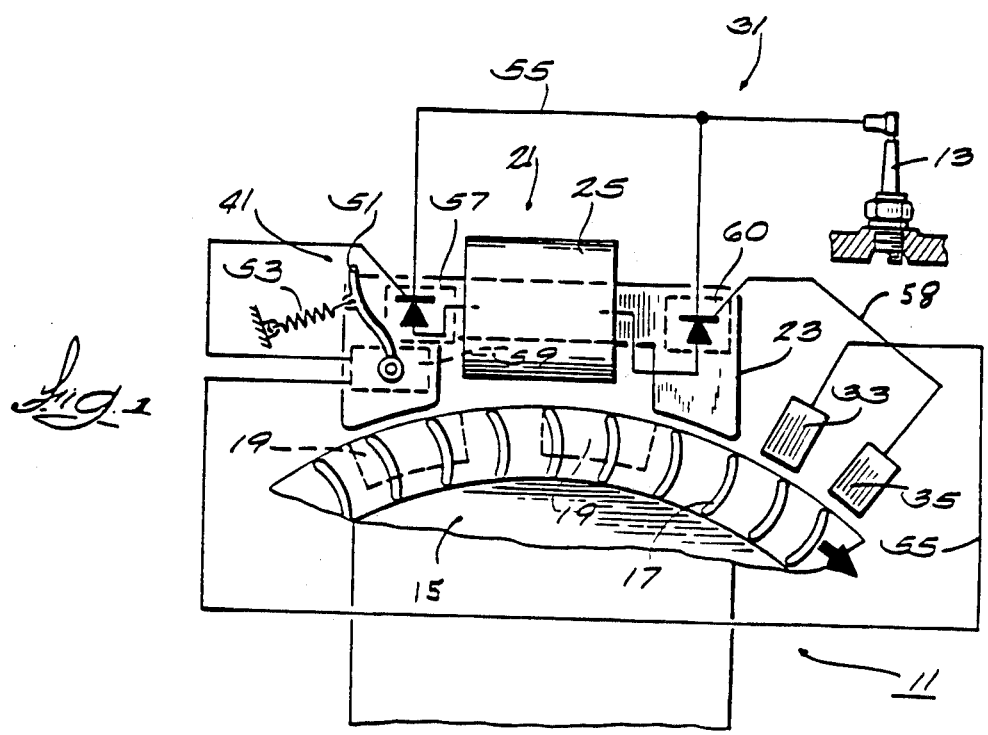
FIG. 1 is a schematic view of one embodiment of an arrangement for retarding the timing of sparking operation in response to engine overspeed operation.

Before explaining one embodiment of the invention in detail, it is to be understood that the invention is not limited in its application to the details of construction and the arrangement of components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

GENERAL DESCRIPTION

Shown schematically in FIG. 1 of the drawings is an internal combustion engine 11 including a spark plug 13 and a flywheel 15 which carries suitable air propelling vanes 17 and suitable magnet means 19 and which is rotatable relative to an ignition module 21 which includes an armature 23 and a charge coil 25, and which, preferably, is sealed from atmospheric contamination and has no moving parts. Any suitable construction can be employed. In some constructions, the magnet means 19 will rotate relative to the ignition module 21 by rotating the magnet means 19 while the ignition module 21 is stationary. In other constructions, the ignition module 21 or frequency sensing means can be stationary and any engine timed or engine driven member can complete the frequency circuit, as hereinafter described, as the member moves past, or in close proximity to, the stationary frequency sensing means.

The relatively rotatable magnet means 19 and charge coil 25 produces a potential which is applicable to the spark plug 13 by a fragmentarily illustrated ignition circuit 31 (provided, in part, in the module 21) to cause firing the spark plug 13 in response to a suitable signal. Any suitable ignition circuit can be used. In other constructions, the means for producing a potential which is applicable to a spark can be a battery or other source of potential.

In this last regard, the module 21 also includes a first trigger means which can take various forms and which can be a coil 33 which is arranged relative to the magnet means 19 and operable, in response to magnet means 19 and operable, in response to magnet means rotation, to generate a first signal which causes application of the potential to the spark plug 13 to cause firing thereof in a first or normal timing of the piston (not shown) relative to top dead center, and a second or retard trigger means which can take various forms and which can be a coil 35 which is arranged relative to the magnet means 19 to produce a second signal which is effective to apply the potential to the spark plug 13 at a later time or at a lesser distance of the piston (not shown) from top dead center. The trigger coils 33 and 35 preferably are part of the module 21. In other constructions, the first and second trigger means can be operated in response to means indicating the engine's rotational speed other than a rotating magnet. Such means can include a frequency counter circuit responsive to the rotation or movement of some engine member or some member directly connected to, and driven by, the engine such as a generator or alternator having a precise frequency requirement.

The engine 11 also includes means 41 connected to the ignition circuit 31 and operable, in response to engine rotation above a given speed, for changing the timing of the firing of the spark plug 13 from the normal timing to the retarded timing, so as thereby to inhibit continued engine speed above the given speed.

Various arrangements can be employed for changing the engine spark timing from normal to retarded. Such means can be mechanical or electronic and can include, for instance, a member forming a part of a hot wire anemometer or a sealed strain gage circuit. In the construction shown in FIG. 1, the means comprises an air vane 51 which is supported by suitable means for movement adjacent to the path of the flywheel 15. Preferably, the vane 51 is supported for pivotal movement by the armature 23. The air vane 51 is biased by a suitable spring 53 toward a first or normal position which does not interefere with the application of potential to the spark plug at the normal timing in response to the generation of the first signal. The location and size of the vane 51 and the biasing force of the spring 53 are such that engine speed above the given speed creates an air flow which is sufficient to displace the air vane 51 to a second position which is spaced angularly from the first position and which is effective to delay application of potential to the spark plug 13 so as to afford retarded timing. In the illustrated construction, the first trigger coil 33 is connected by a line 55 to an electronic switch 57 (preferably part of the module 21) which is actuated by the first trigger coil 33 to apply the potential to the spark plug 13 at the desired normal timing. The line 55 includes a switch 59 (preferably part of the module 21) which is normally biased closed and which is located such that pivotal movement of the air vane 51 to the second position causes opening of the switch 59, thereby disabling operation of the first trigger coil 33 to cause the electronic switch 57 to produce a normally timed spark and permitting subsequent generation by the second trigger coil 35 of the second signal which, when the switch 59 is open, is applied through the line 58 and electronic switch 60 (preferably part of the module 21), to produce a retarded spark. As an inherent consequence of the above described construction, when the engine speed advances above a predetermined or given speed, because of the spaced location of the trigger coils 33 and 35, the timing of the second signal is constant and independent of the amount of engine rotation above the given speed. Hence, the retarded timing is angularly spaced from top dead center at predeterminedangle lesser than the angular spacing of the normal timing from top dead center, and the angular spacing of the retarded timing from the normal timing is constant and independent of the amount of engine rotation about the given speed. The switch 59 can alternatively be arranged to disconnect the first electronic switch 57 from the spark plug 13 so as thereby also to produce a retarded spark.

This invention provides for retarded timing depending on speed. In some instances, it is desirable to have retarded timing irregardless of speed but instead depending on whether an operator has his hands on or off a device such as a lawn mower or a power saw. The invention's retarded spark feature can be used to provide "hand's off" retarded timing.

Arrangements other than the disclosed vane arrangement can also be employed. For instance, centrifugal weights, frequency counters, air flow volume sensors, and/or spark energy sensors can be employed.

Figure 2:
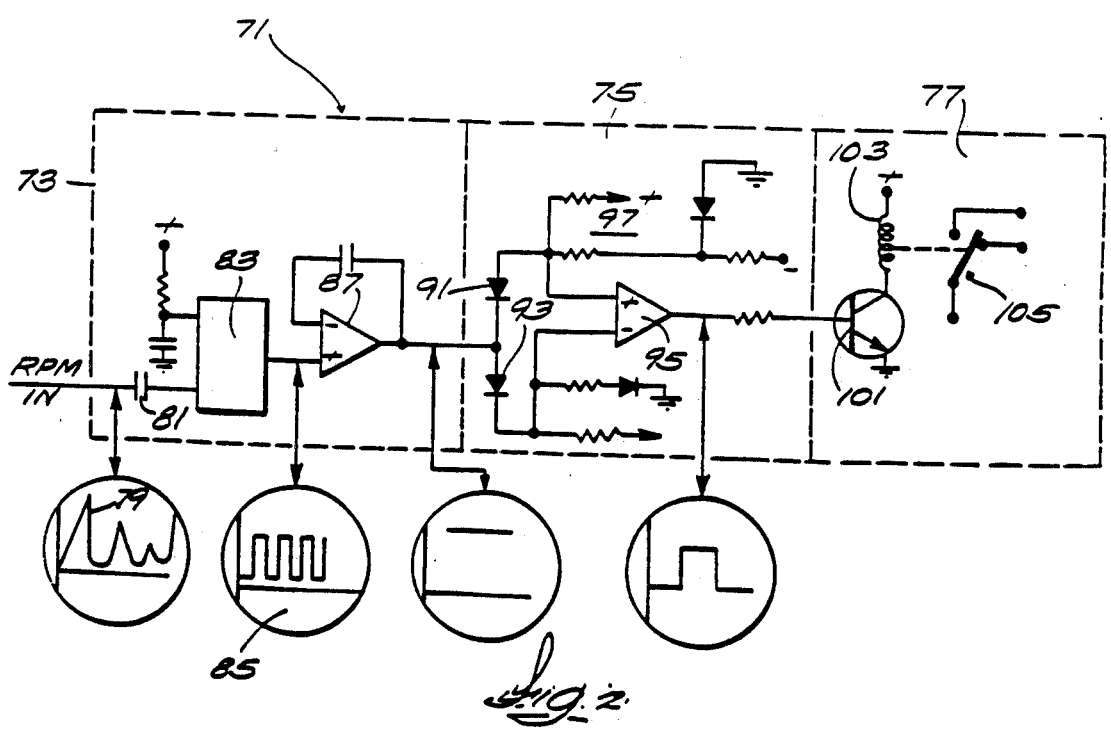
FIG. 2 is schematic view of a circuit operable to retard the timing of sparking operation in response to engine overspeed operation.

Shown in FIG. 2 is an electronic governor ignition control circuit 71 which senses engine speed, which is operable to shift spark timing from retarded to normal when the engine reaches a first or lower speed and to again shift the spark timing from retarded to normal when the engine reaches a first or lower speed and to again shift the spark timing from normal to retarded in the event the engine operates at a speed above a given level, and which is preferably included in the module 21.

More particularly, the ignitiion control circuit operates to provide ignition spark retard at engine RPM ranging from 0 to a predetermined lower RPM, and then provides normal ignition spark when the engine RPM exceeds the predetermined lower RPM, and again provides ignition spark retard when engine RPM exceeds a predetermined upper RPM.

Generally, the control circuit 71 is made up of a signal shaping circuit 73, a comparator circuit 75, and a switching circuit 77, which operate together as follows. An RPM signal 79 is taken, for example, from the primary or secondary ignition coil, (not shown) which signal 79 can alternately be obtained by a generator producing alternating current, (not shown) and is fed through a capacitor 81 to a mono-stable multi-vibrator 83 to remove noise and provide an output wave form as illustrated at 85. The multivibrator output is connected to the plus terminal of an operational amplifier 87 connected to operate as an integrator, so as thereby to provide an average voltage output having a magnitude which varies in response to engine RPM. The voltage output or signal of the integrator 87 is connected to the comparator circuit 75 which includes diodes 91 and 93, an operational amplifier 95, and a biasing network 97 connected, as illustrated, to operate as a window comparator. The window comparator has an output or signal coupled to the switching circuit 77 to provide the desired retard and advance of the ignition spark.

The switching circuit 77 includes a switching transistor 101 and a relay 103 which controls an ignition timing subcircuit 105 so that ignition spark is retarded when the relay 103 is deenergized, and ignition spark is advanced or normal when the relay 103 is energized. The relay 103 is connected so that it is energized when the switching transistor 101 is turned on and deenergized whe the swtching transistor 101 is turned off. The state of the switching transistor 101, in turn, is controlled by the output of the comparator circuit 75 which operates as follows.

For purposes of example only, when the voltage output provided by the integrator 87 has a magnitude corresponding to engine RPM ranging from 0 to 1,200 RPM, the output of the comparator circuit 75 is low so that the switching transistor 101 is biased off and the switching subcircuit 105 provides for ignition spark retard. When the voltage from the integrator 87 has a magnitude which corresponds to engine RPM within the range from 1,200 to 6000 RPM, the comparator circuit 75 switches so that it has a high output which turns on the switching transistor 101, thereby energizing the relay 103 to provide for ignition spark advance to normal timing. When the voltage output of the integrator 87 has a magnitude which corresponds to engine RPM exceeding 6,000 RPM, the comparator circuit 75 again switches to a low output, thereby turning off the switching transistor 101 and de-energizing the relay 103 so that the ignition spark is again retarded.

Although the particular control circuit described operates so that a voltage proportional to engine RPM is utilized to control ignition timing, it should be understood that a circuit could be provided so that the frequency of the signal taken from the primary or secondary ignition coil (not shown) could also be used to provide an indication of engine RPM, and hence control ignition timing.

Various of the features of the invention are set forth in the following claims.

I claim:

1. An internal combustion engine comprising means for providing a potential capable of producing a spark when applied to a spark plug, and means selectively operable for applying said potential to a spark plug so as to selectively produce sparks at normal and retarded timing relative to top dead center and comprising a rotatable member, first trigger means mounted adjacent to said member for generating a first signal which is effective to cause sparking operation of said spark plug at a normal timing, second trigger means mounted adjacent to said member in angularly spaced relation to said first trigger means and operable to generate a second signal which is effective, when said first signal is prevented from causing sparking operation, to cause sparking operation of said spark plug at a retarded timing, and means coupled to said first trigger means and operative in response to engine rotation above a given speed for preventing operation of said first trigger signal to cause sparking operation, whereby said second signal is effective to cause sparking operation at the retarded timing.

2. An internal combustion engine including means for providing a potential capable of producing a spark when applied to a spark plug, means selectively operable for applying said potential to a spark plug to selectively produce sparks at normal and retarded timing relative to top dead center and comprising a rotatable member, first trigger means mounted adjacent to said member for generating a first signal which is effective to cause sparking operation of said spark plug at a normal timing, second trigger means mounted adjacent to said member in angularly spaced relation to said first trigger means and operable to generate a second signal which is effective, when said first signal is prevented from causing sparking operation, to cause sparking operation of said spark plug at a retarded timing which is spaced from normal timing at an angular distance equal to the angular spacing between said first and second trigger means, and means coupled to said first trigger means and operative in response to engine rotation above a given speed, for preventing operation of said first trigger signal to cause sparking operation, whereby said second signal is effective to cause sparking operation at the retarded timing.

* * * * *